(12) United States Patent
Berghaus et al.

(10) Patent No.: US 12,559,891 B2
(45) Date of Patent: Feb. 24, 2026

(54) METHOD FOR PRODUCING AN ARTIFICIAL TURF

(71) Applicant: TARKETT SPORTS CANADA INC., Montréal (CA)

(72) Inventors: Ulrich Berghaus, Troisdorf (DE); Gregory T. Randall, Dalton, GA (US); Jürgen Morton-Finger, Weinheim (DE); Dirk Hanuschik, Geilenkirchen (DE)

(73) Assignee: TARKETT SPORTS CANADA INC., Montreal (CA)

( * ) Notice: Subject to any disclaimer, the term of this patent is extended or adjusted under 35 U.S.C. 154(b) by 335 days.

(21) Appl. No.: 18/042,903

(22) PCT Filed: Aug. 20, 2021

(86) PCT No.: PCT/EP2021/073204
§ 371 (c)(1),
(2) Date: Feb. 24, 2023

(87) PCT Pub. No.: WO2022/043231
PCT Pub. Date: Mar. 3, 2022

(65) Prior Publication Data
US 2023/0295883 A1 Sep. 21, 2023

(30) Foreign Application Priority Data
Aug. 26, 2020 (EP) ..................................... 20192846

(51) Int. Cl.
| B32B 37/04 | (2006.01) |
| B32B 5/12 | (2006.01) |
(Continued)

(52) U.S. Cl.
CPC ................ *E01C 13/08* (2013.01); *B32B 5/12* (2013.01); *B32B 37/04* (2013.01); *B32B 37/156* (2013.01);
(Continued)

(58) Field of Classification Search
CPC ........... B32B 2471/00; B32B 2305/70; B32B 2305/22; B32B 2262/16; B32B 38/0036;
(Continued)

(56) References Cited

U.S. PATENT DOCUMENTS

| 7,364,634 B1 | 4/2008 | Irwin, Sr. | |
| 2013/0101756 A1* | 4/2013 | Kim | .................... D06N 7/0076 |
| | | | 428/17 |
| 2020/0223196 A1* | 7/2020 | Coon | ........................ B32B 5/02 |

FOREIGN PATENT DOCUMENTS

| EP | 2011919 | 1/2009 |
| EP | 2430232 | 3/2017 |
(Continued)

OTHER PUBLICATIONS

International Preliminary Report on Patentability issued by the International Bureau on Mar. 9, 2023, 12 pages.
(Continued)

*Primary Examiner* — Vishal I Patel
(74) *Attorney, Agent, or Firm* — Sprinkle IP Law Group

(57) ABSTRACT

The invention relates to method for producing an artificial turf, comprising the following steps: providing a carrier material having a top and a bottom, providing a plurality of fibres, wherein each fibre comprises two ends extending from the top of the carrier material and comprising a connected region arranged in a loop-like manner at the bottom of the carrier material; feeding the carrier material with the fibres to a heated rotating calender roller; guiding the carrier material with the fibres over at least one sub-
(Continued)

Figure 1:
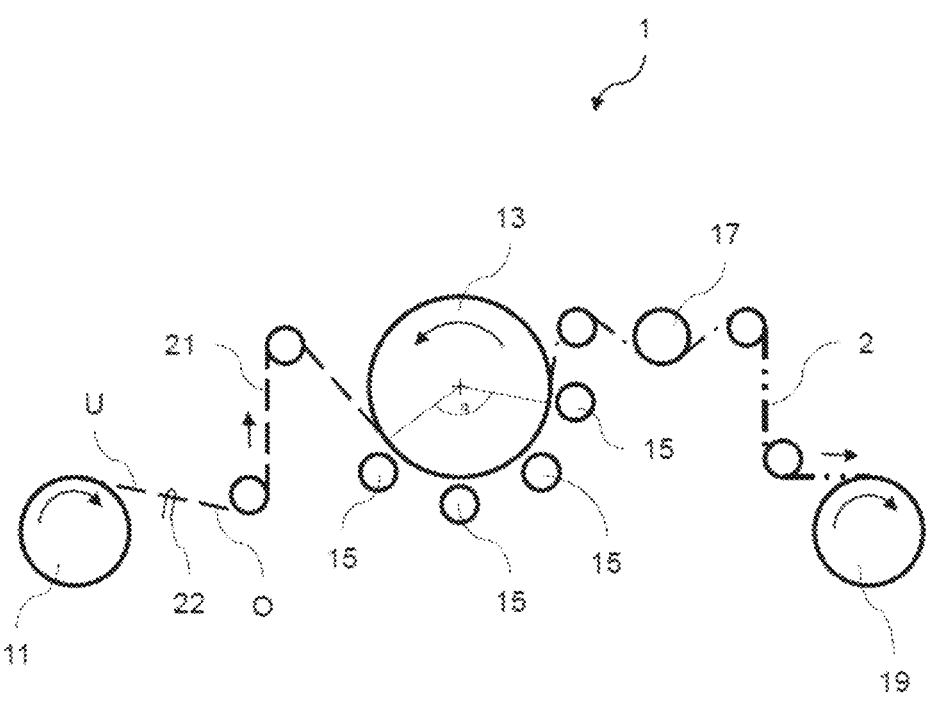

region of the surface of the heated rotating calender roller, wherein the connected regions of the fibres and the bottom of the carrier material face the calender roller; during the guiding of the carrier material with the fibres over the at least one sub-region of the surface of the heated rotating calender roller: transferring heat from the heated rotating calender roller to the carrier material with the fibres, and fusing the connected regions of the fibres with the bottom of the carrier material to the artificial turf, and removing and cooling the artificial turf. The invention further relates to an artificial turf comprising: a carrier material having a top and a bottom; a plurality of fibres, wherein each fibre comprises two ends extending from the top of the carrier material and comprising a connected region arranged in a loop-like manner at the bottom of the carrier material, wherein the carrier material is fused at the bottom to the connected regions of the fibres.

7 Claims, 13 Drawing Sheets

(51) Int. Cl.
| | |
|---|---|
| *B32B 37/00* | (2006.01) |
| *B32B 37/24* | (2006.01) |
| *B32B 38/00* | (2006.01) |
| *E01C 13/08* | (2006.01) |

(52) U.S. Cl.
CPC .......... *B32B 37/24* (2013.01); *B32B 38/0036* (2013.01); *B32B 2262/16* (2021.05); *B32B 2305/22* (2013.01); *B32B 2305/70* (2013.01); *B32B 2471/00* (2013.01)

(58) Field of Classification Search
CPC ......... B32B 37/156; B32B 37/04; B32B 5/12; E01C 13/08
See application file for complete search history.

(56) References Cited

FOREIGN PATENT DOCUMENTS

| | | | | | |
|---|---|---|---|---|---|
| EP | 2430232 | B1 * | 3/2017 | ............... | B32B 7/06 |
| JP | H11241308 | | 9/1999 | | |
| WO | WO2014060796 | | 4/2014 | | |
| WO | WO-2014060796 | A1 * | 4/2014 | ............. | A41G 1/009 |
| WO | WO2019222610 | A1 | 11/2019 | | |
| WO | WO2022043231 | A1 | 3/2022 | | |

OTHER PUBLICATIONS

International Search Report and Written Opinion issued by the European Patent Office as the Searching Authority (EPO/ISA) on Nov. 25, 2021, 20 pages.

* cited by examiner

METHOD FOR PRODUCING AN ARTIFICIAL TURF

CROSS-REFERENCE TO RELATED APPLICATIONS

This is a national stage application of, and claims a benefit of priority under 35 U.S.C. § 371 from, International Application No. PCT/EP2021/073204, filed Aug. 20, 2021, entitled "METHOD FOR PRODUCING ARTIFICIAL TURF," which claims a benefit of priority from European Patent Application No. 20192846.2, filed Aug. 26, 2020, both of which are hereby expressly incorporated by reference herein for all purposes.

The present invention relates to an artificial turf as well as to a method for its production.

Conventional plastic artificial turf consists essentially of fibres incorporated into a multi-layered composite consisting of textile, reinforcement mesh, and non-woven fabrics. Such artificial turf has thus far included a variety of different types of material, such as polyethylene (PE) or polypropylene (PP) in the subsurface material or in the artificial turf fibres, as well as latex or polyurethane (PU) for coatings, for example, for the attachment of fibres. Such a variety of disparate types of material in an artificial turf product worsens the recyclability after its service life, which in turn leads to a poorer environmental footprint, an increased total energy consumption and CO2 emissions, and increased total lifecycle costs. In the years 2010 to 2012, there were first developments of artificial turf without latex and polyurethane. However, there was no technical implementation or market launch of these development products.

Multi-layered artificial turf as well as methods for producing the same are known in the prior art. For example, a rug composition with a laminated film back and a method for producing the same is known from WO 2019/222610 A1. In the method provided therein, the cohesion between the fibres and a subsurface material is created in that a film/coating is laminated and melted onto the loops of the fibres at the rear side of the subsurface material in order to keep the fibres in position.

It is disadvantageous in the method for producing an artificial turf described in WO 2019/222610 A1 that the connection of the fibres to the subsurface material is produced exclusively via the fed-in film/coating in that the film connects to the subsurface material and the rear fibre sections. The rear fibre sections are therefore indirectly connected to the subsurface material by the film in a roundabout manner. The film is thus absolutely necessary for the production of the artificial turf, because otherwise the fibres could simply be pulled out of the subsurface material. Due to this mandatory requirement of a film, the process complexity is increased. Because the film is often made of different materials than the substrate material or the fibres, the recyclability of the artificial turf is made more difficult or impossible, which in particular adversely affects the environmental footprint of such artificial turf. In addition, this increases the energy required over the entire service life of the artificial turf as well as the associated CO$_2$ output.

It is therefore a problem addressed by the present invention to provide a method for producing an artificial turf, having a simple, short, and inexpensive workflow capable of producing artificial turf of high quality and recyclability. It is further a problem addressed by the present invention to provide an artificial turf having a high quality and recyclability and produced by the method according to the invention.

According to the present invention, this problem is solved by a method for producing an artificial turf according to claim 1 as well as by an artificial turf according to claim 17. Preferred embodiments of the invention are described in the subclaims.

The method according to the invention comprises the following steps: providing a carrier material having a top and a bottom, providing a plurality of fibres, wherein each fibre comprises two ends extending from the top of the carrier material and comprising a connected region arranged in a loop-like manner at the bottom of the carrier material; feeding the carrier material with the fibres to a heated rotating calender roller; guiding the carrier material with the fibres over at least one sub-region of the surface of the heated rotating calender roller, wherein the connected regions of the fibres and the bottom of the carrier material face the calender roller; during the guiding of the carrier material with the fibres over the at least one sub-region of the surface of the heated rotating calender roller: transferring heat from the heated rotating calender roller to the carrier material with the fibres, and fusing the connected regions of the fibres with the bottom of the carrier material to the artificial turf, and removing and cooling the artificial turf.

In the method according to the invention, the cohesion between the fibres and the carrier material is produced in that the fibres are directly fused to the carrier material at the connected regions of the fibres. Thus, in particular, a simple, compact, and stable construction of the artificial turf is ensured, and in particular no additional film is required in order to connect the fibres to the carrier material. Further, this can reduce the material consumption and increase the recyclability of the artificial turf, because the artificial turf contains fewer individual components and the connection between fibres and carrier material is produced without any additional components. Because only the carrier material with the plurality of fibres is guided over the calender roller and must be fused, the complexity of the method and the processing time are also reduced.

Preferably, in the step of guiding, at least one rotating pressure roller is spaced apart by a calender gap and is arranged substantially axis-parallel to the calender roller, wherein the pressure roller presses the carrier material with the fibres against the heated rotating calender roller with a predetermined pressing force.

The at least one pressure roller arranged about the calender roller guides the carrier material with the fibres in a predetermined position over at least a sub-region of the surface of the heated rotating calender roller, whereby the process accuracy can be increased and the carrier material with the fibres can be prevented from slipping. As a result, a particularly good i.e. even fusing of the rear side of the carrier material with the connected regions of the fibres can be achieved. Further, by adjusting the calender gap, the pressing force on the carrier material with the fibres can be adjusted, thereby further improving the process accuracy and strengthening the connection between the carrier material and the fibres. In addition, the pressing force of the pressure rollers accelerates the fusing between the fibres and the carrier material, thereby achieving similar strength values with less dwell times on the calender roller, thus reducing the process time.

In a preferred embodiment, the method according to the invention further comprises a step of providing a film, wherein, in the step of feeding the carrier material, the film is fed between the bottom of the carrier material with the connected regions of the fibres and the heated rotating calender roller, and wherein, in the step of transferring heat, the film is fused to the bottom of the carrier material and to the connected regions of the fibres.

Locally, the film is fused to the bottom of the carrier material as well as to the connected regions of the fibres. This strengthens the connection between carrier material and fibres and thus also increases the pull-out strength of the fibres. Globally, that is to say viewed throughout the artificial turf, the film provides additional stability to the artificial turf. "Stability" is understood here to refer to pulling strength and elongation (determined in a pulling test), thermal stability (determined in a shrinkage test) as well as stability in the laying of artificial turf tracts, in particular against warping and folding of the artificial turf in a broad ambient temperature range.

In a further preferred embodiment, the method according to the invention comprises a step of providing a film, wherein, after the step of removing and cooling the artificial turf, the film is fed between a bottom of the artificial turf and a further heated rotating calender roller; a step of transferring heat from the further heated rotating calender roller to the bottom of the artificial turf and the film; a step of fusing the bottom of the artificial turf with the film to form a coated artificial turf; as well as the steps of removing and cooling the coated artificial turf.

The film is not already fused to the bottom of the carrier material and to the connected regions of the fibres during the step of transferring heat. Instead, the artificial turf is guided from the heated rotating calender roller to a further heated rotating calender roller, wherein the film is fused to the bottom of the artificial turf. This further strengthens the connection between carrier material and fibres and thus also increases the pull-out strength of the fibres. Globally, that is to say viewed throughout the artificial turf, the film provides additional stability to the artificial turf. Furthermore, with the use of a further heated rotating calender roller, the process guiding and the setting of the process parameters (e.g. temperature of the calender rollers, pressure, dwell time, etc.) for the production of the artificial turf is simplified, because the process parameters for the further heated rotating calender roller can be selected separately and specifically for the melting of the film.

Preferably, the step of providing a film comprises scattering a plastic granulate onto a conveyor belt, conveying the plastic granulate by means of the conveyor belt to a heat introduction region, introducing heat and melting the plastic granulate, conveying the molten plastic granulate to a pressure introduction region, introducing pressure and compressing of the molten plastic granulate into a film having a predetermined thickness, and removing and cooling the film.

The starting material here is a plastic granulate, which enables better handling, for example during transport and storage, than a pre-assembled film. Because the production of the film is integrated in the method according to the invention, the properties of the film (for example the strength, film thickness, etc.) can be flexibly adapted to the requirements of the artificial turf by a suitable choice of, for example, the amount of plastic granulate, the chemical composition of the plastic granulate, as well as the extent and duration of the heat introduction and the pressure introduction. In addition, the integration of film production into the artificial turf production process allows the production process to be uninterrupted, for example in order to replace a film, because only plastic granulate is refilled and the film can thus be produced continuously.

According to a further aspect, the method according to the invention comprises providing a plastic granulate, wherein, in the step of feeding the carrier material, the plastic granulate is fed between the bottom of the carrier material with the connected regions of the fibres and the heated rotating calender roller, and wherein, during the step of transferring heat, the plastic granulate is fused to the bottom of the carrier material and to the connected regions of the fibres.

The starting material here is a plastic granulate, which enables better handling, for example during transport and storage, than a pre-assembled film. In particular, the plastic granulate can be easily fed by scattering it onto the bottom of the carrier material with the connected fibres. Locally, the plastic granulate is fused to the bottom of the carrier material as well as to the connected regions of the fibres by the calender roller. This strengthens the connection between carrier material and fibres and thus also increases the pull-out strength of the fibres. Globally, that is to say viewed throughout the artificial turf, the melted plastic granulate provides additional stability to the artificial turf. It is not necessary to feed a film, which requires additional process steps as well as the adjustment and monitoring thereof. Thus, problems that can arise when feeding a film (process accuracy, breaking of the film, etc.) are avoided, and the process is simplified overall. In addition, the properties of the artificial turf (firmness, artificial turf height, etc.) can be flexibly adjusted by the amount of the plastic granulate, the chemical composition of the plastic granulate, the amount and duration of the heat introduction and the pressure introduction from the calender roller and the pressure rollers, respectively.

According to a further aspect, the method according to the invention further comprises providing a plastic granulate, wherein, after the step of removing and cooling the artificial turf, the plastic granulate is fed between a bottom of the artificial turf and a further heated rotating calender roller; transferring heat from the further heated rotating calender roller to the bottom of the artificial turf and plastic granulate; fusing the bottom of the artificial turf with the plastic granulate into a coated artificial turf; and removing and cooling the coated artificial turf.

The starting material here is a plastic granulate, which enables better handling, for example during transport and storage, than a pre-assembled film. In particular, the plastic granulate can be easily fed by scattering it onto the bottom of the carrier material with the connected fibres. The plastic granulate is not already fused to the bottom of the carrier material and to the connected regions of the fibres during the step of transferring heat. Instead, the artificial turf is guided from the heated rotating calender roller to a further heated rotating calender roller, wherein the plastic granulate is fused to the bottom of the artificial turf and forms a coating. This further strengthens the connection between carrier material and fibres and thus also increases the pull-out strength of the fibres. When viewed throughout the artificial turf, the coating created by the melt provides additional stability to the artificial turf. Furthermore, with the use of a further heated rotating calender roller, the process guiding and the setting of the process parameters (e.g. temperature of the calender rollers, pressure, dwell time, etc.) for the production of the artificial turf is simplified, because the process parameters for the further heated rotating calender roller can be selected separately and specifically for the melting of the plastic granulate. It is not necessary to feed a film, which requires additional process steps as well as the adjustment and monitoring thereof. Thus, problems that can arise when feeding a film (process accuracy, breaking of the film, etc.) are avoided, and the process is simplified overall. In addition, the properties of the coating (firmness, coating thickness, etc.) can be flexibly adjusted to the requirements of the coated artificial turf by the amount of the plastic granulate, the chemical composition of the plastic granulate, the amount and duration of the heat introduction and the pressure introduction from the calender roller and the pressure rollers, respectively.

According to one aspect of the present invention, in the step of guiding, at least one rotating pressure roller is spaced apart by a calender gap and is arranged substantially axis-parallel to the calender roller and/or the further calendar roller, wherein the pressure roller presses the carrier material with the fibres and the film or the plastic granulate against the heated rotating calender roller and/or the further heated calender roller with a predetermined pressing force.

The at least one pressure roller arranged about the calender roller and/or the further calender roller guides the carrier material with the fibres and the film or the plastic granulate, or the artificial turf and the film or the plastic granulate, in a predetermined position over at least a sub-region of the surface of the heated rotating calender roller and/or over at least a subregion of the surface of the further heated rotating calender roller, whereby the process accuracy can be increased and the carrier material with the fibres and the film or the plastic granulate, or the artificial turf and the film or the plastic granulate, can be prevented from slipping. Further, by adjusting the calender gap, the pressing force on the carrier material with the fibres and the film or the plastic granulate, or on the artificial turf and the film or the plastic granulate, can be adjusted, thereby further improving the process accuracy and strengthening the connection between the carrier material, the fibres, and the film or the coating.

According to the present invention, it is further preferred that the carrier material and the film or plastic granulate be formed from substantially the same type of material.

The use of only one type of material for the carrier material and the film or plastic granulate improves the recyclability of the artificial turf, because no other materials, such as latex, polyurethane, etc., need to be separated from it. Moreover, this simplifies the process management and setting of the process parameters for the production of the artificial turf, because, due to the use of similar materials for the carrier material and the film or plastic granulate, their melting points are also similar, for example.

Preferably, the carrier material and the fibres are formed from substantially the same type of material, according to the present invention.

The use of only one type of material for the carrier material and the fibres improves the recyclability of the artificial turf, because no other materials, such as latex, polyurethane, etc., need to be separated from it. Moreover, this simplifies the process management and setting of the process parameters for the production of the artificial turf, because, due to the use of similar materials for the carrier material and the fibres, their melting points are also similar, for example.

In a further preferred embodiment according to the present invention, the carrier material comprises recycled and recyclable material and/or the fibres comprise recycled and recyclable material.

The use of recycled or recyclable material for the carrier material and/or fibres improves the environmental footprint of the artificial turf (in particular, this can save a high degree of material consumption, energy, and CO2 emissions). Moreover, by using recycled material for the carrier material and/or the fibres, the production costs for the artificial turf can be reduced, because, instead of new material, recycled material from, for example, old artificial turf can also be reused. Further, only the use of recyclable material allows for the recycling of the artificial turf after the end of the service life and thus its re-entry into the material cycle.

The film or plastic granulate can comprise recycled and/or recyclable material according to the present invention.

The use of recycled or recyclable material for the film or the plastic granulate further improves the environmental footprint of the artificial turf (in particular, this can save a high degree of material consumption, energy, and CO2 emissions). Moreover, by using recycled material for the film or the plastic granulate, the production costs for the artificial turf can be reduced, because, instead of new material, recycled material (for example, old artificial turf, also called "end-of-life (EOL) turf") can also be used as a secondary raw good or secondary material. Further, the use of recyclable material allows for the recycling of the artificial turf after the end of the service life and thus its re-entry into the material cycle.

Preferably, the film according to the present invention comprises a first layer, a second layer, and a third layer, wherein the carrier material and the first layer and the third layer are formed from substantially the same type of material, wherein the second layer comprises recycled artificial turf scrap.

For example, multi-layer films, wherein the layers comprise different types of material, can be produced using the method of multi-layer extrusion (co-extrusion). The use of substantially the same type of material for the carrier material and the first and third layer of the film improves the recyclability of the artificial turf, because no other kinds of materials, such as latex, polyurethane, etc., are included. If material in the artificial turf is nevertheless to be processed that is contaminated with other materials (e.g. sand, latex, polyurethane, or infill residues), the second layer of the film can comprise such a scrap material. This is particularly advantageous when recycled material from old artificial turf is to be reused but is contaminated with latex, for example. The soiled scrap material can thus be incorporated and stabilized between two substantially pure layers. Thus, for example, the blown film process does not result in an undesirable bursting of the hose bubble by dirt particles.

According to one aspect of the present invention, the film can comprise a first layer, a second layer, and a third layer, wherein the first layer comprises a material having modified adhesion properties, wherein the carrier material and the third layer are formed from substantially the same material, and wherein the second layer comprises recycled artificial turf scrap.

Using a material with modified adhesion properties in the first layer facing the bottom of the carrier material increases the adhesion force between the first layer and the carrier material as well as between the first layer and the connected regions of the fibres and also improves the pull-out strength of the fibres. By using the same type of material for the carrier material and the third layer of the film, the recyclability of the artificial turf can be improved, because no other materials, such as latex, polyurethane, etc., are contained therein. Thus, the environmental footprint of the artificial turf can also be improved (in particular, a high degree of material consumption, energy, and CO2 emissions can be saved as a result). If material in the artificial turf is nevertheless to be processed that is contaminated with other materials (e.g. sand, latex, polyurethane, or infill residues), the second layer of the film can comprise such a scrap material. This is particularly advantageous when recycled material from old artificial turf is to be reused but is contaminated with latex, for example. The soiled scrap material can thus be incorporated and stabilized between two substantially pure layers. Thus, for example, the blown film process does not result in an undesirable bursting of the hose bubble by dirt particles.

According to a further aspect of the present invention, the method further comprises thermally treating the artificial turf and/or the coated artificial turf by means of steam or hot air.

Carrying out a thermal treatment process improves the uniformity of the artificial turf and coated artificial turf, respectively, as well as the uniformity of the artificial turf fibres. In addition, impurities in or on the artificial turf or fibres can thereby be eliminated, which increases the quality of the artificial turf.

According to a further aspect, the method for producing an artificial turf according to the present invention further comprises perforating the artificial turf and/or the coated artificial turf.

Carrying out a perforation results in the required properties of water permeability of the artificial turf in operation.

Further, an artificial turf according to the present invention is proposed, comprising: a carrier material having a top and a bottom; a plurality of fibres, wherein each fibre comprises two ends extending from the top of the carrier material and comprising a connected region arranged in a loop-like manner at the bottom of the carrier material, wherein the carrier material is fused at the bottom to the connected regions of the fibres.

In the artificial turf according to the invention, the cohesion between the fibres and the carrier material is produced in that the fibres are directly fused to the carrier material at the connected regions. Thus, in particular, a simple construction of the artificial turf is ensured, and no additional film is required in order to connect the fibres to the carrier material, and the artificial turf can be produced with low material consumption. The artificial turf according to the invention is in particular characterized by a simple construction with a comparable pull-out strength. Further, because the artificial turf contains fewer individual components from different types of material, the recyclability of the artificial turf can thereby be increased.

Preferably, the artificial turf further comprises a film, wherein the film is fused to the bottom of the carrier material and to the connected regions of the fibres.

Locally, the film is fused to both the bottom of the carrier material and the connected regions of the fibres, thus strengthening the connection between the carrier material and fibres and thus the pull-out strength of the fibres. Globally, that is to say viewed throughout the artificial turf, the film provides additional stability to the artificial turf.

In a preferred embodiment, the film comprises a first layer, a second layer, and a third layer, wherein the carrier material and the first layer and the third layer are formed from substantially the same material, wherein the second layer comprises recycled artificial turf scrap.

The use of substantially the same type of material for the carrier material and the first and third layer of the film improves the recyclability of the artificial turf, because a majority of the artificial turf thus consists of the same type of material and few or no other kind of materials, such as latex, polyurethane, etc., are included. If material in the artificial turf is nevertheless to be processed that is contaminated with other materials (e.g. sand, latex, polyurethane, or infill residues), the second layer of the film can comprise such a scrap material. The soiled scrap material can thus be incorporated and stabilized between two substantially pure layers, i.e. uncontaminated layers. Thus, for example, the blown film process does not result in an undesirable bursting of the hose bubble by dirt particles. Thus, contaminated materials of, for example, old artificial turf (artificial turf scrap) can also be used in the artificial turf according to the invention, which, in addition to the advantages described above, also further improves the environmental footprint of the artificial turf, because material from older artificial turf is efficiently reused. In particular, a high degree of energy and $CO_2$ emissions can be saved as a result.

In an alternative preferred embodiment, the film comprises a first layer, a second layer, and a third layer, wherein the first layer comprises a material having modified adhesion properties, wherein the carrier material and the third layer are formed from substantially the same material, and wherein the second layer comprises recycled artificial turf scrap.

Using a material with modified adhesion properties for the first layer facing the bottom of the carrier material increases the adhesion force between the first layer and the carrier material as well as between the first layer and the connected regions of the fibres and also improves the pull-out strength of the fibres. By using the same type of material for the carrier material and the third layer of the film, the recyclability of the artificial turf can be improved, because no other kind of materials, such as latex or polyurethane, are included. Thus, the environmental footprint of the artificial turf can also be improved (in particular, a high degree of energy and $CO_2$ emissions can be saved as a result). If material in the artificial turf is nevertheless to be processed that is contaminated with other materials (e.g. sand, latex, polyurethane, or infill residues), the second layer of the film can comprise such a scrap material. The soiled scrap material can thus be incorporated and stabilized between two substantially pure layers. Thus, for example, the blown film process does not result in an undesirable bursting of the hose bubble by dirt particles.

According to a further aspect, the artificial turf according to the present invention further comprises a coating, wherein the coating is formed by a plastic granulate melted on the bottom of the artificial turf.

The melting of plastic granulate at the bottom of the artificial turf forms a preferably continuous coating. Locally, the coating is fused to both the bottom of the carrier material and the connected regions of the fibres, thus strengthening the connection between the carrier material and fibres and thus the pull-out strength of the fibres. Globally, i.e., when viewed throughout the coated artificial turf, the coating created by the melting of the plastic granulate provides additional stability to the coated artificial turf. In addition, the properties of the coating (firmness, coating thickness, etc.) can be flexibly adjusted to the requirements of the coated artificial turf by the amount of the plastic granulate, the chemical composition of the plastic granulate, the amount and duration of the heat introduction and the pressure introduction from the calender roller and the pressure rollers, respectively.

The artificial turf according to the present invention is preferably produced according to any one of the methods of the invention discussed in further detail herein.

Figure 2:
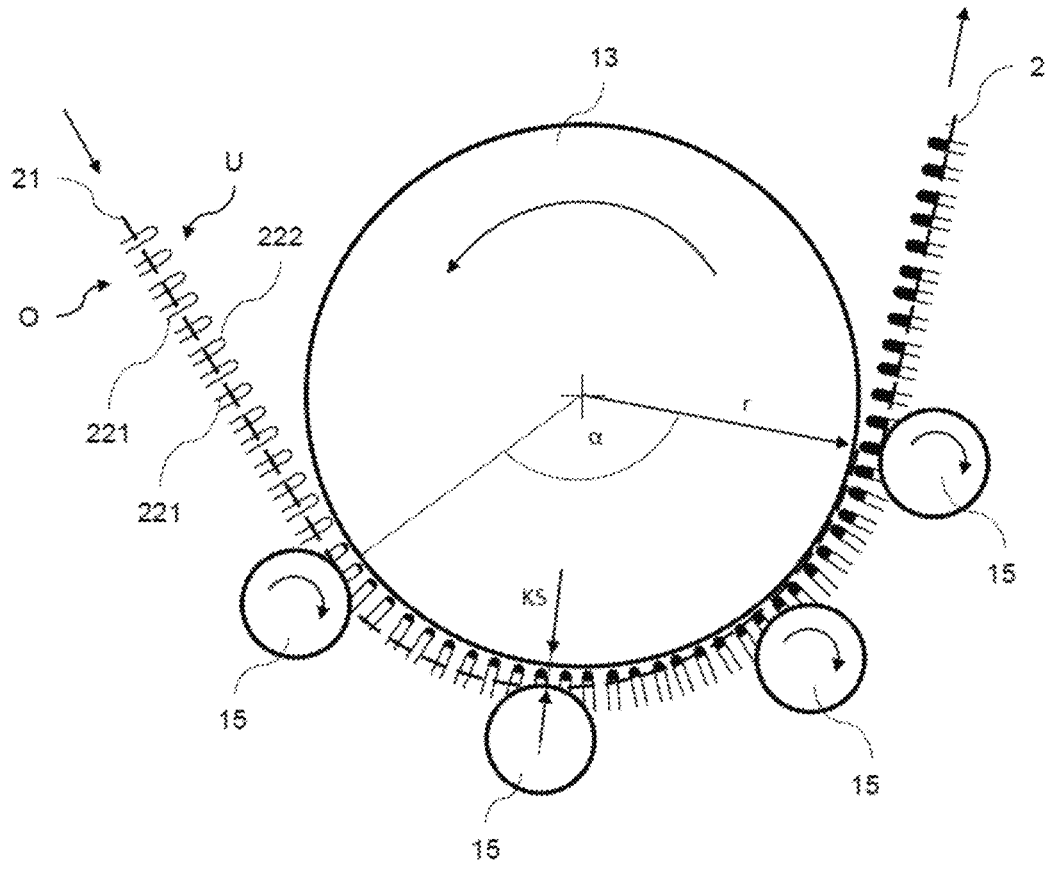
Figure 3:
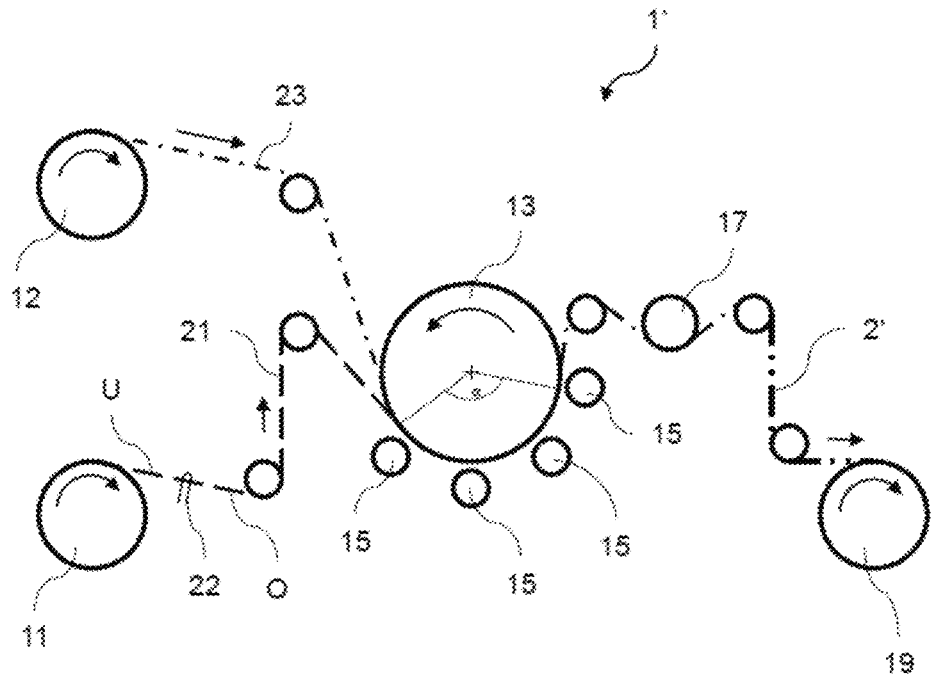
Figure 4:
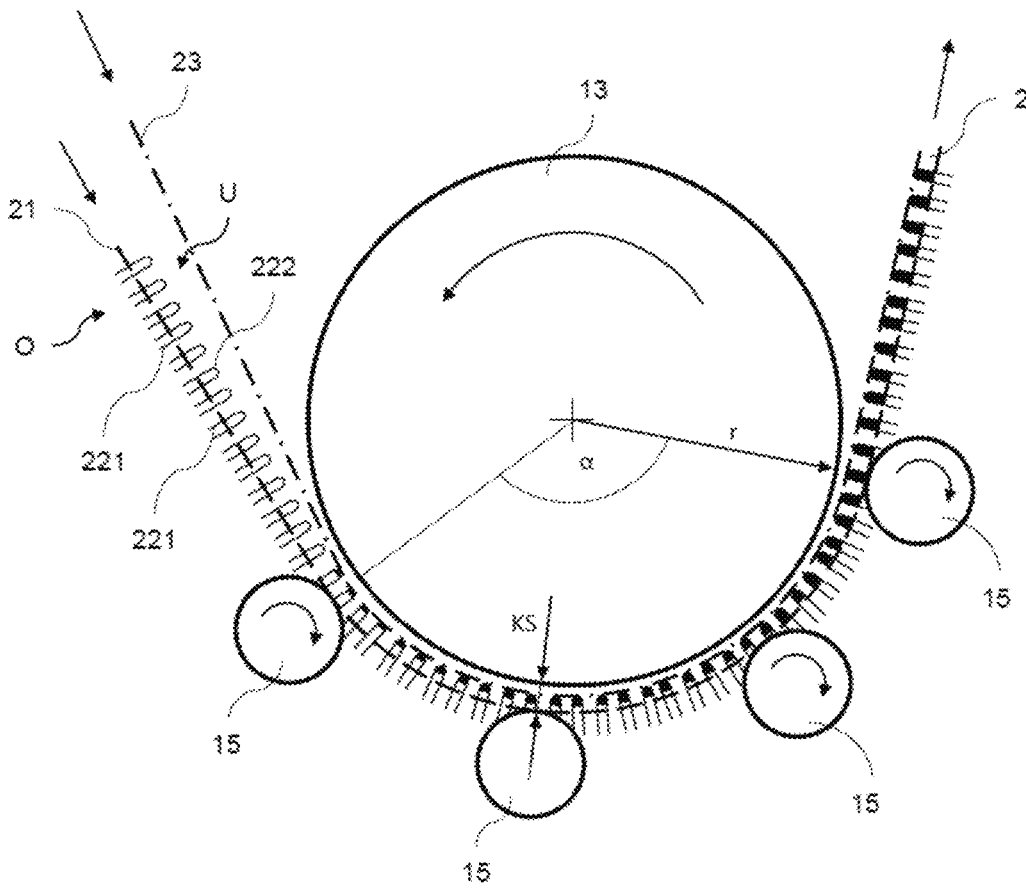
Figure 5:
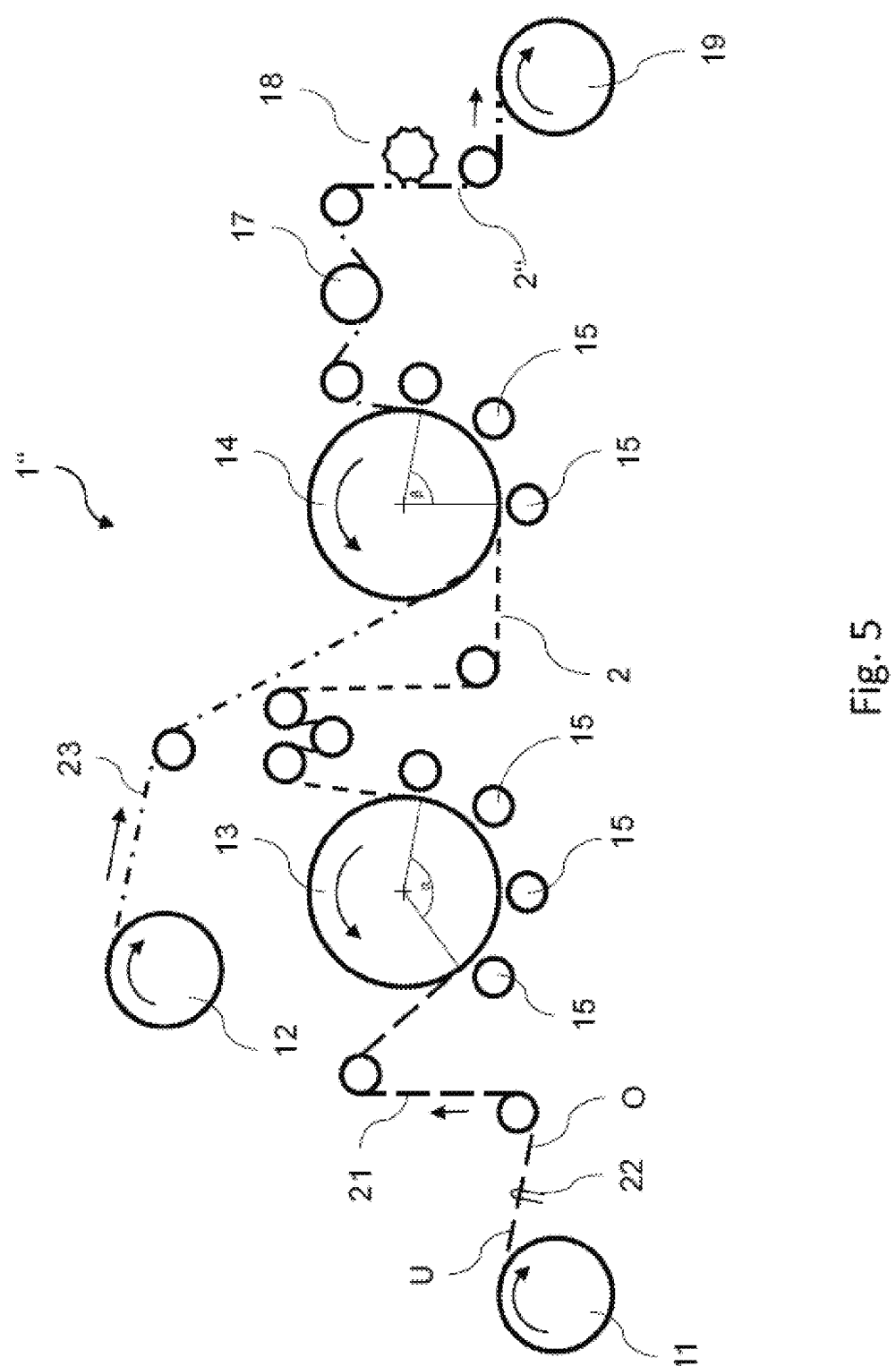
Figure 6:
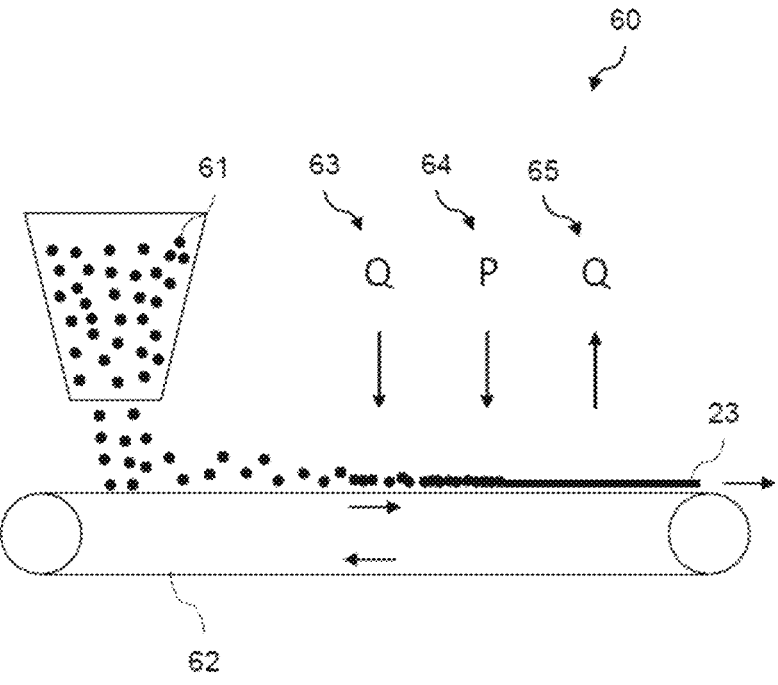
Figure 7:
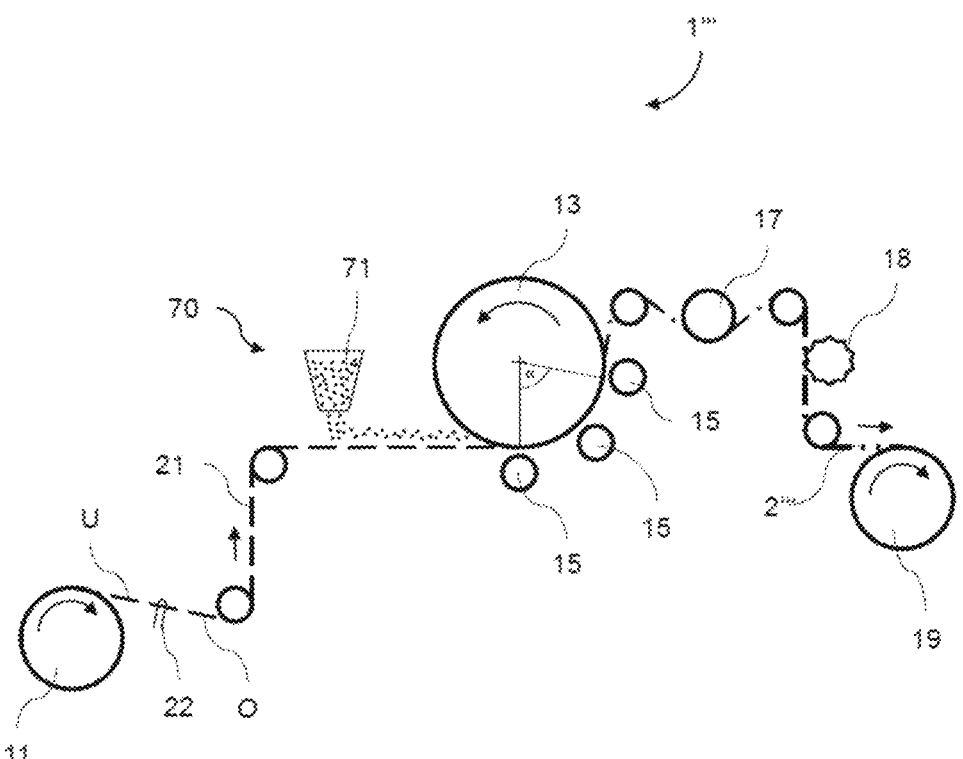
Figure 8:
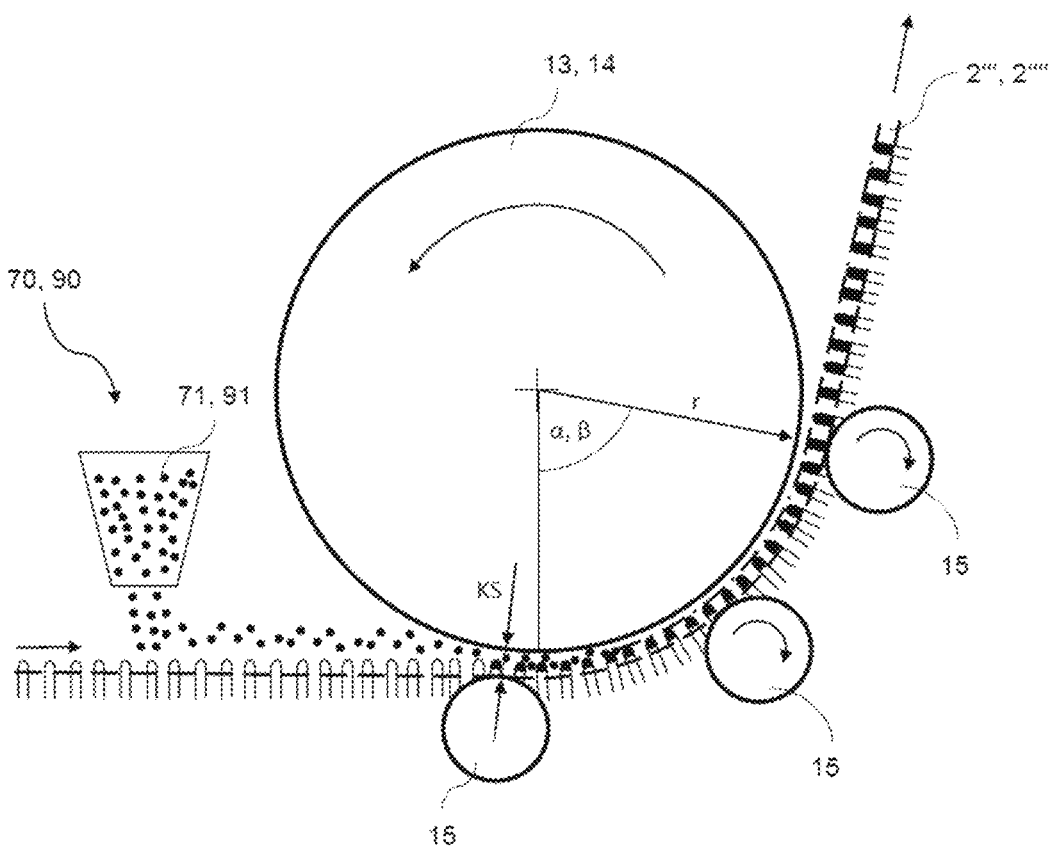
Figure 9:
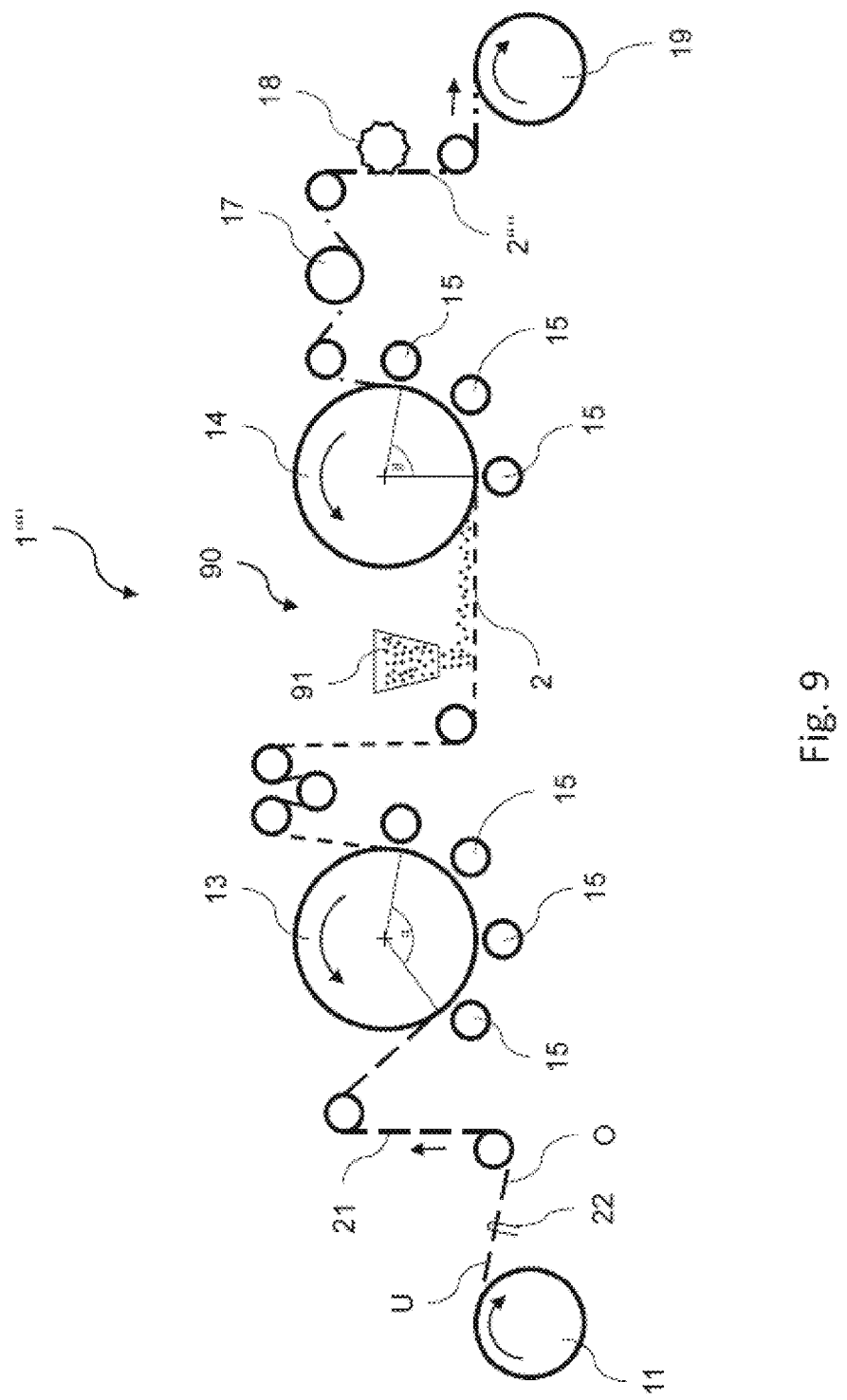
Figure 10A:
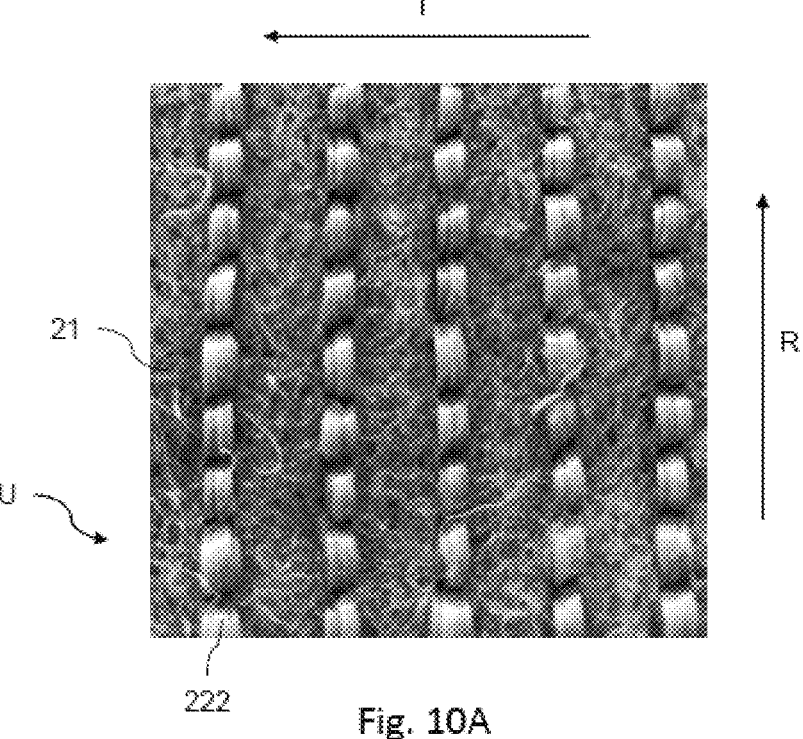
Figure 10B:
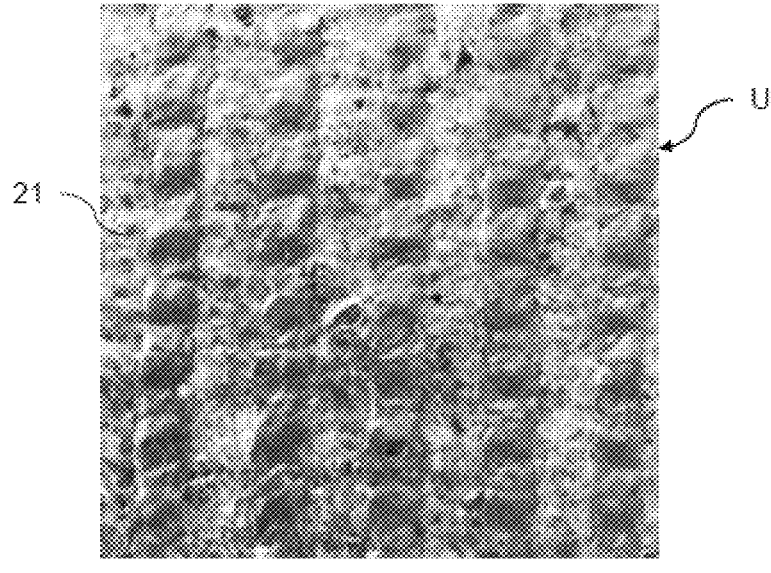
Figure 10C:
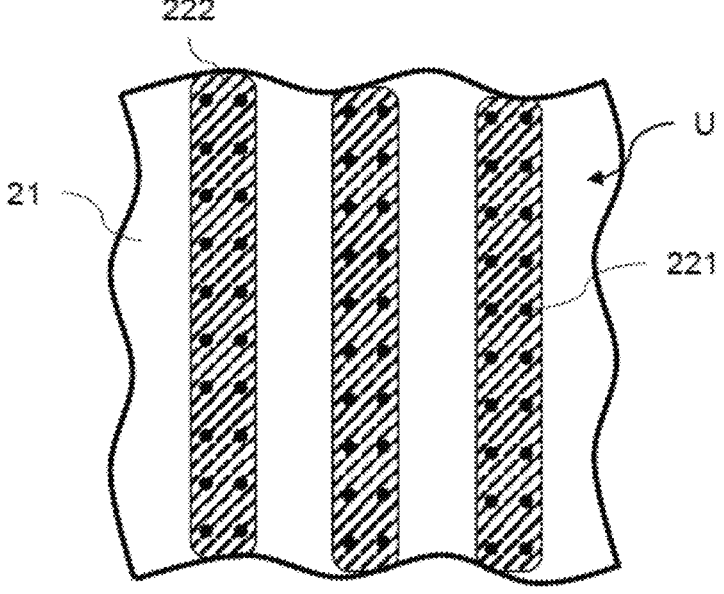
Figure 11:
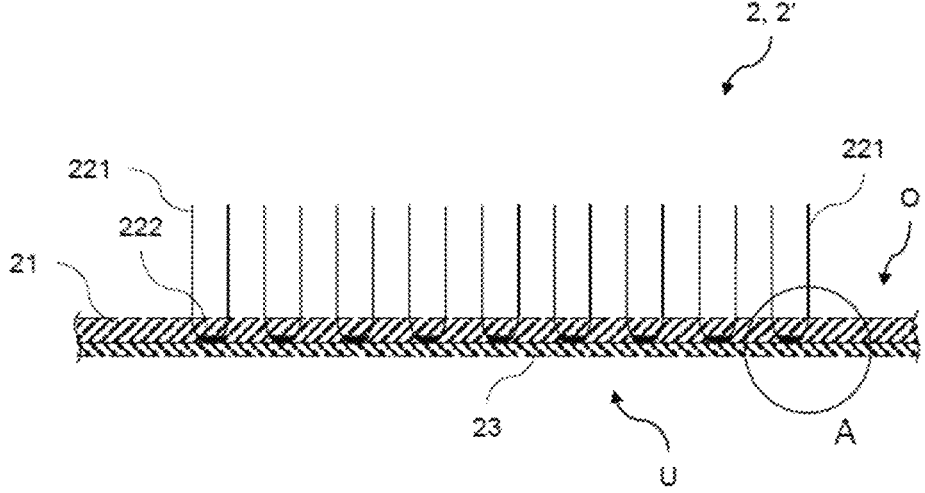
Figure 12:
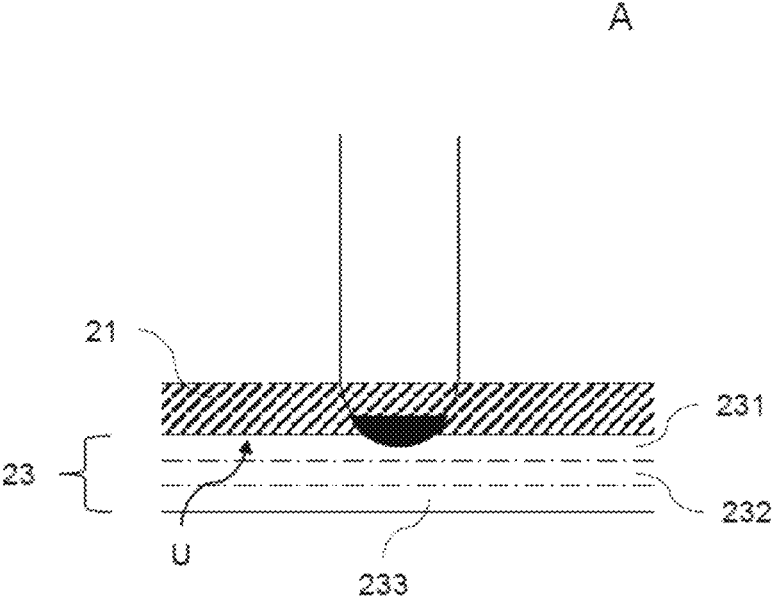

The invention will be explained in the following on the basis of embodiments shown in the accompanying figures. The following are shown:

FIG. 1 a schematic side view of an apparatus for carrying out the method for producing an artificial turf according to one embodiment of the present invention;

FIG. 2 an enlarged, schematic side view of a calender roller and a plurality of pressure rollers of the apparatus of FIG. 1, while carrying out the method for producing an artificial turf according to the invention;

FIG. 3 a schematic side view of an apparatus for carrying out the method for producing an artificial turf according to a further embodiment of the present invention;

FIG. 4 an enlarged, schematic side view of a calender roller and a plurality of pressure rollers of the apparatus of FIG. 3, while carrying out the method for producing an artificial turf according to the invention;

FIG. 5 a schematic side view of an apparatus for carrying out the method for producing an artificial turf according to a further embodiment of the present invention;

FIG. 6 a schematic side view of an apparatus for providing a film according to an embodiment of the present invention;

FIG. 7 a schematic side view of an apparatus for carrying out the method for producing an artificial turf according to a further embodiment of the present invention;

FIG. 8 an enlarged, schematic side view of a calender roller and a plurality of pressure rollers of the apparatus of FIG. 7, while carrying out the method for producing an artificial turf according to the invention;

FIG. 9 a schematic side view of an apparatus for carrying out the method for producing an artificial turf according to a further embodiment of the present invention;

FIG. 10A an excerpt of a tufted carrier material used for producing an artificial turf with the method according to the invention, viewed from a bottom;

FIG. 10B an excerpt of an artificial turf produced with the method according to the invention, viewed from a bottom;

FIG. 10C a schematic illustration of an artificial turf produced with the method according to the invention, viewed from a bottom;

FIG. 11 a schematic side view of an excerpt of an artificial turf produced with the method according to the invention; and FIG. 12 a schematic detail view of the region from FIG. 11 marked A.

In FIGS. 1 and 3, the carrier material 21 is shown with a dashed line, the film 23 with a dash-dot line with a point, and the artificial turf 2, 2' with a dash-dot line with two points.

The apparatus 1 shown in FIG. 1 comprises, in the illustrated embodiment, a magazine roller 11 for carrier material 21, a plurality of diverter rollers, a calender roller 13, a plurality of pressure rollers 15, at least one cooling roller 17, and a magazine roller 19 for artificial turf 2.

The carrier material 21 is provided on the magazine roller 11. Preferably, the carrier material 21 comprises a fabric structure consisting of, for example, PE and/or PP (so-called PE and/or PP support ribbons of the slit film type), which are permeable to, for example, rainwater. Likewise, the carrier material 21 can be a fabric structure consisting of co-extruded monofilaments and ribbons so as to be able to advantageously combine materials having different melting points. The carrier material 21 comprises a top O and a bottom U and is provided with a plurality of fibres 22. For reasons of illustration, only one fibre 22 is shown by way of example in FIG. 1. As shown in FIG. 2, each fibre 22 comprises two free ends 221 extending from the top O of the carrier material 21 and comprises a connected region 222 arranged in a loop-like manner at the bottom U of the carrier material 21. In other words, the fibres 22 are initially loosely inserted into the carrier material 21 with the free ends 221. This arrangement of at least one fibre 22 in the carrier material 21 is referred to as tuft. The fibres 22 can be arranged on the carrier material 21 either individually or in bundles and according to a certain pattern or without a pattern. A carrier material 21 provided with a plurality of fibres 22 in this manner is also referred to as a tufted carrier material 21. In FIG. 10A, an excerpt of a tufted carrier material 21 is shown from below. The fibres 22 are arranged in bundles and in rows on the carrier material 21. The vertical arrow R indicates a row direction of the tufted rows, and the horizontal arrow T indicates a splitting direction that is substantially orthogonal to the row direction. The discernible connected regions 222 of the fibres (also called fibre loops) are not yet firmly connected to one another and to the carrier material 21 (also called the backing).

From the magazine roller 11, the tufted carrier material 21 is unrolled and guided via diverter rollers towards the calender roller 13, which is represented by an arrow along the carrier material 21 on the left side in FIGS. 1 and 2.

The calender roller 13 has a predetermined radius r and is rotatably driven by a motor (not shown), wherein the direction of rotation of the calender roller 13 shown in FIGS. 1 and 2 shown by a counterclockwise arrow. The rotation speed of the calender roller 13 is adjustable in this case. Further, the calender roller 13 is heatable (for example, via an integrated heating system, not shown), thereby allowing the surface of the calender roller 13 to be heated to a predetermined temperature. In the embodiment shown in FIGS. 1 and 2, multiple pressure rollers 15 are arranged adjacent to the calender roller 13 at a predetermined, adjustable distance to the calender roller 13, hereinafter referred to as the calender gap CG. The pressure rollers 15 are arranged substantially parallel to the axis of rotation of the calender roller 13 and are also rotatably supported, wherein the direction of rotation of the pressure rollers 15 is shown in FIG. 2 by arrows in the clockwise direction. The pressure rollers 15 in the described embodiment can be passive pressure rollers (not driven) as well as active pressure rollers (rotationally driven).

The tufted carrier material 21 is guided onto the rotating and heated calender roller 13. The bottom U of the carrier material 21 and the connected regions 222 of the fibres 22 face the surface of the calender roller 13, and the top O of the carrier material 21 and free ends 221 of the fibres 22 face away from the surface of the calender roller 13. The carrier material 21 is guided between the surface of the calender roller 13 and the pressure rollers 15. Here, the pressure rollers 15 can exert a pressure on the carrier material 21 and the fibres 22, which can be altered by an adjustment of the calender gap CG. As shown in FIGS. 1 and 2, the tufted carrier material 21 is guided over a predetermined sub-region of the outer surface of the calender roller 13, which is defined by the angle α. In other words, the carrier material 21 with the plurality of fibres 22 comes into contact with the surface of the calender roller 13 in a predetermined lateral surface segment defined by the angle α. This angle α can be altered by adjusting the arrangement of the diverter rollers relative to the calender roller 13.

While the tufted carrier material 21 is passed over the calender roller 13, the calender roller 13 transfers heat to the bottom U of the carrier material 21 and to the connected regions 222 of the fibres 22 in order to fuse them together. The strength of the connection between the fibres 22 and the carrier material 21 is substantially influenced by the temperature of the calender roller 21, the rotational speed of the calender roller 21, the angle α, and the pressure exerted by the pressure rollers 15 on the carrier material 21 and the fibres 22. The temperature at the surface of the calender roller 13 is set greater than or equal to the melting temperatures of the carrier material 21 and the fibres 22 so that the connected regions of the fibres 22 are fused to the bottom U of the carrier material 21 and form the artificial turf 2. The rotational speed of the calender roller 13, along with the radius r and the angle α, substantially determines the dwell time. The dwell time is the time in which the tufted carrier material 21 remains in contact with the calender roller 13 and can receive thermal energy from the calender roller 13. As the dwell time of the tufted carrier material 21 on the calender roller 13 progresses, there is an increasing melting connection between the carrier material 21 and the connected regions 222 of the fibres 22. A longer dwell time of the tufted carrier material 21 on the calender roller 13 results in a higher strength of the melting connection, which is shown in FIG. 2 by the increasingly large fused region (black region at the bottom U of the tufted carrier material 21). The pressure from the pressure rollers 15 against the tufted carrier material 21 towards the calender roller also influences the strength and quality of the connection between the fibres 22 and the carrier material 21. A higher contact pressure can accelerate the fusion between fibres 22 and carrier material 21 and strengthen the connection between fibres 22 and carrier material 21. In addition, the pressure force provided by the pressure rollers 15 pushes air out of the connection between the carrier material 21 and fibres 22. The aforementioned process parameters are preferably set such that the melting connection between the connected regions 222 and the carrier material 21 is formed entirely upon the removal of the artificial turf 2 from the calender roller 13. The bottom surface U of a carrier material 21, in which the connected regions 222 of the fibres 22 are fused to the carrier material 21 and thus form the artificial turf 2, is shown in FIG. 10B. It should be noted that, in the artificial turf shown in FIG. 10B produced by the method according to the invention, rows have formed due to the fusion, in that adjacent bundles of fibres have fused together. This also has a positive effect on the pull-out strength. Also shown in FIG. 10C is a schematic sectional view of the artificial turf 2 of FIG. 10B. The rows formed by the fusion of the fibres 22 with the carrier material 21 are shown shaded. In this sectional view, the exposed ends 221 are shown as black dots.

After the connected regions 222 of the fibres 22 are fused to the bottom U of the carrier material 21, the artificial turf 2 is fed away from the calender roller 13 and cooled. As shown in FIG. 1, the artificial turf 2 can be cooled by guiding the artificial turf 2 over a rotating cooling roller 17. The cooling roller 17 can either be passively cooling (e.g. room temperature or above) or actively cooling, wherein the actively cooled cooling roller 17 is cooled to a pre-determined temperature below room temperature via a cooling assembly (not shown). The cooled artificial turf 2 is then fed away from the cooling roller 17 and rolled up on a magazine roller 19 for artificial turf 2 and magazined.

The apparatus 1' shown in FIG. 3 comprises, in the illustrated embodiment, a magazine roller 11 for carrier material 21, a magazine roller 12 for a film 23, a plurality of diverter rollers, a calender roller 13, a plurality of pressure rollers 15, at least one cooling roller 17, and a magazine roller 19 for artificial turf 2'. The steps of providing a carrier material 21, providing a plurality of fibres 22 and feeding the carrier material 21 with the fibres 22 to a heated rotating calender roller 13 are substantially identical to the embodiment described above and shown in FIGS. 1 and 2, and therefore a repeated description of these steps is omitted.

As shown in FIGS. 3 and 4, a film 23 is unrolled from the magazine roller 12 in addition to the tufted carrier material 21 and fed to the heated rotating calender roller 13 via diverter rollers, which is shown by an arrow on the left side in FIGS. 3 and 4.

The film 23 is guided at the bottom of the tufted carrier material 21. The bottom U of the carrier material 21 and the connected regions 222 of the fibres 22 face the surface of the calender roller 13, the top O of the carrier material 21 and free ends 221 of the fibres 22 face away from the surface of the calender roller 13, and the film 23 lies between the bottom U of the tufted carrier material 21 and the calender roller 13. The carrier material 21 and the film 23 are guided between the surface of the calender roller 13 and the pressure rollers 15. The pressure rollers 15 can apply a pressure to the tufted carrier material 21 and the film 23, which can be changed by an adjustment of the calender gap CG. As shown in FIGS. 3 and 4, the tufted carrier material 21 and the film 23 are guided over a predetermined subregion of the outer surface of the calender roller 13, which is defined by the angle α. In other words, the carrier material 21 with the plurality of fibres 22 and the film 23 comes into contact with the surface of the calender roller 13 in a predetermined lateral surface segment defined by the angle α. This angle α can be altered by adjusting the arrangement of the diverter rollers relative to the calender roller 13.

While the tufted carrier material 21 and the film 23 are passed over the calender roller 13, the calender roller 13 transfers heat to the film 23, the bottom U of the carrier material 21, and the connected regions 222 of the fibres 22 in order to fuse them together. The temperature at the surface of the calender roller 13 is set to be greater than or equal to the melting temperatures of the film 23, the carrier material 21, and the fibres 22. On the one hand, the connected regions of the fibres 22 are thereby fused to the bottom U of the carrier material 21. On the other hand, in the embodiment shown in FIGS. 3 and 4, the film 23 is also fused to both the bottom U of the carrier material 21 and the connected regions of the fibres 22. As the dwell time of the tufted carrier material 21 and the film 23 on the calender roller 13 progresses, there is an increasing melting connection between the carrier material 21, the connected regions 222 of the fibres 22, and the film 23, thereby forming the artificial turf 2'. A longer dwell time of the tufted carrier material 21 and the film 23 on the calender roller 13 results in a higher strength and quality of the melting connection, which is shown in FIG. 4 by the increasingly large fused region (black region at the bottom U of the tufted carrier material 21). A higher contact pressure can accelerate the fusion between fibres 22, the carrier material 21, and the film 23 and strengthen the connection between fibres 22, the carrier material 21, and the film 23. In addition, the pressure force provided by the pressure rollers 15 pushes air out of the connection between the carrier material 21, the fibres 22, and the film 23. The aforementioned process parameters are preferably set such that the melting connection between the connected regions 222, the carrier material 21, and the film 23 is formed entirely upon the removal of the artificial turf 2' from the calender roller 13.

The aforementioned process parameters are preferably set such that the melting connection between the connected regions 222, the carrier material 21, and the film 23 is formed entirely upon the removal of the artificial turf 2' from the calender roller 13. In addition to the process parameters described above, the film 23 influences the strength of the connection between the fibres 22 and the carrier material 21. Because the film 23 locally connects to the carrier material 21 as well as the connected regions 222 of fibres 22, the connection between the carrier material 21 and the fibres 22 is strengthened, and the pull-out strength of the fibres 22 is increased. In addition, the film 23 globally connects with the entire carrier material 21, thereby also increasing the stability of the carrier material 21.

After the connected regions 222 of the fibres 22, the bottom U of the carrier material 21, and the film 23 are fused, the artificial turf 2' is fed away from the calender roller 13 and cooled. The process of cooling the artificial turf 2' and rolling up and magazining the artificial turf 2' on a magazine roller 19 is analogous to the embodiment shown in FIGS. 1 and 2.

The apparatus 1" shown in FIG. 5 comprises, in the illustrated embodiment, a magazine roller 11 for carrier material 21, a magazine roller 12 for a film 23, a plurality of diverter rollers, a calender roller 13, a further calender roller 14, a plurality of pressure rollers 15, at least one cooling roller 17, at least one perforation roller 18, and a magazine roller 19 for coated artificial turf 2". The steps of providing a carrier material 21, providing a plurality of fibres 22 and feeding the carrier material 21 with the fibres 22 to a heated rotating calender roller 13 are substantially identical to the embodiment described above and shown in FIGS. 1 and 2, and therefore a repeated description of these steps is omitted.

Unlike in the embodiment shown in FIGS. 3 and 4, the carrier material 21 with the fibres 22 is fed to the heated rotating calender roller 13 without a film, which is substantially identical to the embodiment shown in FIGS. 1 and 2. After the connected regions 222 of the fibres 22 are fused to the bottom U of the carrier material 21, the artificial turf 2 is fed away from the calender roller 13. However, the artificial turf 2 is not subsequently rolled up and magazined on the magazine roller 19 for artificial turf, but rather guided to a further rotating calender roller 14.

As shown in FIG. 5, a film 23 is unrolled from the magazine roller 12 and fed via diverter rollers to the further heated rotating calender roller 14, which is represented by an arrow on the upper left side in FIG. 5. The film 23 is guided at the bottom of the artificial turf 2. The bottom of the artificial turf 2 faces the surface of the further calender roller 14, the top side of the artificial turf 2 faces away from the surface of the further calender roller 14, and the film 23 lies between the bottom side of the artificial turf 2 and the further calender roller 14. The artificial turf 2 and the film 23 are guided between the surface of the further calender roller 14 and the pressure rollers 15. The pressure rollers 15 can exert a pressure on the artificial turf 2 and the film 23, which can be changed by an adjustment of the calender gap. As shown in FIG. 5, the artificial turf 2 and the film 23 are guided over a predetermined sub-region of the outer surface of the further calender roller 14, which is defined by the angle β. In other words, the artificial turf 2 with the film 23 comes into contact with the surface of the further calender roller 14 in a predetermined lateral surface segment defined by the angle β. This angle β can be altered by adjusting the arrangement of the diverter rollers relative to the further calender roller 14.

While the artificial turf 2 and the film 23 are guided over the further calender roller 14, the further calender roller 14 transfers heat to the film 23 and the bottom of the artificial turf 2 in order to fuse them together. The temperature at the surface of the further calender roller 14 is set to be greater than or equal to the melting temperatures of the film 23 and the artificial turf 2. In the embodiment shown in FIG. 5, the film 23 is thereby fused to the bottom of the artificial turf 2 and thus forms a coating. As the dwell time of the artificial turf 2 and the film 23 on the further calender roller 14 progresses, an increasing melting connection between the artificial turf 2 and the film 23 forms, whereby the coated artificial turf 2" is formed. A longer dwell time of the artificial turf 2 and the film 23 on the further calender roller 14 leads to a higher strength and quality of the melting connection. A higher contact pressure can accelerate the fusing between the artificial turf 2 and the film 23 and strengthen the connection between the artificial turf 2 and the film 23. In addition, the pressure force provided by the pressure rollers 15 pushes air out of the connection between the artificial turf 2 and the film 23. The aforementioned process parameters are preferably set such that the melting connection between the artificial turf 2 and the film 23 is completely formed upon removal of the coated artificial turf 2" from the further calender roller 14.

After the artificial turf 2 and the film 23 are fused, the coated artificial turf 2" is fed away from the further calender roller 14 and cooled. As shown in FIG. 5, the coated artificial turf 2" can be cooled by guiding the coated artificial turf 2" over a rotating cooling roller 17. The cooling roller 17 can either be passively cooling (e.g. room temperature or above) or actively cooling, wherein the actively cooled cooling roller 17 is cooled to a pre-determined temperature below room temperature via a cooling assembly (not shown).

The cooled coated artificial turf 2" is subsequently fed away from the cooling roller 17 in the illustrated embodiment and further fed to a perforation roller 18. The perforation roller 18 comprises means for perforating the coated artificial turf 2", which is shown by jagged lines in FIG. 5. Through the perforation of the coated artificial turf 2", apertures are specifically introduced into the coated artificial turf 2", which impart a desired water permeability to the coated artificial turf 2" during use.

After cooling and perforation, the coated artificial turf is rolled up and magazined 2". The process of rolling up and magazining the coated artificial turf 2" on a magazine roller 19 is analogous to the embodiment shown in FIGS. 1 and 2, for which reason a further description of these steps is omitted.

In the embodiments according to the invention shown in FIGS. 3 and 5, the case was considered that the film 23 is provided and fed by means of a magazine roller 12 in a pre-assembled manner. According to a further preferred embodiment of the present invention, however, the film 23 can also be produced and fed during the performance of the method according to the invention, which is described in further detail in FIG. 6.

An apparatus 60 for producing a film 23 is provided for this purpose. First, a plastic granulate 61 provided in a container is evenly spread onto a conveyor belt 62. The plastic granulate 61 can comprise any desired polymer compositions. In particular, the plastic granulate 61 can also include fibre scrap from old artificial turf, which improves the recyclability of the artificial turf or coated artificial turf to be produced. The conveyor belt 62 passes through a multi-step process with the scattered plastic granulate 61 (polymer layer). The plastic granulate 61 is conveyed via the conveyor belt 62 to a heat introduction region 63, in which the scattered product is first melted by introduction of heat Q. The now molten plastic granulate 61 is conveyed further from the conveyor belt 62 to a pressure introduction region 64. In the pressure introduction region 64, pressure P is introduced by passing the molten plastic granulate 61 e.g. between a pair of rollers, thereby compressing the molten plastic granulate 61 into a contiguous film 23 having a desired thickness, e.g. between 0.1 and 0.5 mm, preferably 0.3 mm. Then, the cooling and solidification of the film 23 takes place.

The resulting film 23 can then be cut to the desired finished width, for example, and unwound on a magazine roller 12 and temporarily stored (not shown) in order to be available for the method according to the invention, e.g. as shown in FIG. 3 or 5. On the other hand, the process steps carried out by the apparatus 60 for producing a film 23 can also be integrated directly into the method according to the invention in that the magazine roller 12 is replaced by the apparatus 60, as shown in FIG. 3 or 5, which continuously provides the film 23.

The apparatus 1'" shown in FIG. 7 comprises, in the illustrated embodiment, a magazine roller 11 for carrier material 21, a plurality of diverter rollers, an apparatus 70 for providing a plastic granulate 71, a calender roller 13, a plurality of pressure rollers 15, at least one cooling roller 17, at least one perforation roller 18, and a magazine roller 19 for artificial turf 2". The steps of providing a carrier material 21, providing a plurality of fibres 22 and feeding the carrier material 21 with the fibres 22 to a heated rotating calender roller 13 are substantially identical to the embodiment described above and shown in FIGS. 1 and 2, and therefore a repeated description of these steps is omitted.

In this respect, compared to the embodiment shown in FIG. 3, not film but rather plastic granulate 71 is supplied. The plastic granulate 71 is fed on a bottom U of the tufted carrier material 21. For this purpose, the plastic granulate 71, which is provided in a container, is evenly scattered on the bottom U of the tufted carrier material 21. The plastic granulate 71 can comprise any desired polymer compositions. In particular, the plastic granulate 71 can also include fibre scrap from old artificial turf, which improves the recyclability of the artificial turf to be produced.

The bottom U of the carrier material 21 and the connected regions 222 of the fibres 22 face the surface of the calender roller 13, the top O of the carrier material 21 and free ends 221 of the fibres 22 face away from the surface of the calender roller 13, and the plastic granulate 71 is located between the bottom U of the tufted carrier material 21 and the calender roller 13. The carrier material 21 and the plastic granulate 71 are guided between the surface of the calender roller 13 and the pressure rollers 15. The pressure rollers 15 can apply a pressure to the tufted carrier material 21 and the plastic granulate 71, which can be changed by an adjustment of the calender gap CG. As shown in FIGS. 7 and 8, the tufted carrier material 21 and the plastic granulate 71 are guided over a predetermined sub-region of the outer surface of the calender roller 13, which is defined by the angle α. In other words, the carrier material 21 with the plurality of fibres 22 and the plastic granulate 71 comes into contact with the surface of the calender roller 13 in a predetermined lateral surface segment defined by the angle α. This angle α can be altered by adjusting the arrangement of the diverter rollers relative to the calender roller 13.

While the tufted carrier material 21 and the plastic granulate 71 are passed over the calender roller 13, the calender roller 13 transfers heat to the plastic granulate 71, the bottom U of the carrier material 21, and the connected regions 222 of the fibres 22 in order to fuse them together. The temperature at the surface of the calender roller 13 is set to be greater than or equal to the melting temperatures of the plastic granulate 71, the carrier material 21, and the fibres 22. On the one hand, the connected regions of the fibres 22 are thereby fused to the bottom U of the carrier material 21. On the other hand, in the embodiment shown in FIGS. 7 and 8, the plastic granulate 71 is also fused to both the bottom U of the carrier material 21 and the connected regions of the fibres 22. As the dwell time of the tufted carrier material 21 and the plastic granulate 71 on the calender roller 13 progresses, there is an increasing melting connection between the carrier material 21, the connected regions 222 of the fibres 22, and the plastic granulate 71, thereby forming the artificial turf 2". A longer dwell time of the tufted carrier material 21 and the plastic granulate 71 on the calender roller 13 results in a higher strength and quality of the melting connection, which is shown in FIG. 8 by the increasingly large fused region (black region at the bottom U of the tufted carrier material 21). A higher contact pressure can accelerate the fusion between fibres 22, the carrier material 21, and the plastic granulate 71 and strengthen the connection between fibres 22, the carrier material 21 and the molten plastic granulate 71. In addition, the pressure force provided by the pressure rollers 15 pushes air out of the connection between the carrier material 21, the fibres 22, and the molten plastic granulate 71. The aforementioned process parameters are preferably set such that the melting connection between the connected regions 222, the carrier material 21, and the molten plastic granulate 71 is formed entirely upon the removal of the artificial turf 2'" from the calender roller 13.

The aforementioned process parameters are preferably set such that the melting connection between the connected regions 222, the carrier material 21, and the molten plastic granulate 71 is formed entirely upon the removal of the artificial turf 2'" from the calender roller 13. In addition to the process parameters described above, the molten plastic granulate 71 influences the strength of the connection between the fibres 22 and the carrier material 21. Because the plastic granulate 71 locally connects to the carrier material 21 as well as the connected regions 222 of fibres 22, the connection between the carrier material 21 and the fibres 22 is strengthened, and the pull-out strength of the fibres 22 is increased. In addition, the plastic granulate 71 globally connects with the entire carrier material 21, thereby also increasing the stability of the carrier material 21.

After the connected regions 222 of the fibres 22, the bottom U of the carrier material 21, and the plastic granulate 71 are fused, the artificial turf 2'" is fed away from the calender roller 13 and cooled. The process of cooling the artificial turf 2'" is analogous to the embodiment shown in FIGS. 1 and 2.

The artificial turf 2'" is subsequently fed away from the cooling roller 17 and further fed to a perforation roller 18. The perforation roller 18 comprises means for perforating the artificial turf 2'", which is shown by jagged lines in FIG. 7. Through the perforation of the artificial turf 2'", apertures are specifically introduced into the artificial turf 2'", which impart a desired water permeability to the artificial turf 2'" during use.

After cooling and perforating, the artificial turf 2'" is rolled up and magazined. The process of rolling up and magazining the artificial turf 2'" on a magazine roller 19 is analogous to the embodiment shown in FIGS. 1 and 2, for which reason a further description of these steps is omitted.

The apparatus 1"" shown in FIG. 9 comprises, in the illustrated embodiment, a magazine roller 11 for carrier material 21, a plurality of diverter rollers, an apparatus 90 for providing a plastic granulate 91, a calender roller 13, a further calender roller 14, a plurality of pressure rollers 15, at least one cooling roller 17, at least one perforation roller 18, and a magazine roller 19 for coated artificial turf 2"". The steps of providing a carrier material 21, providing a plurality of fibres 22 and feeding the carrier material 21 with the fibres 22 to a heated rotating calender roller 13 are substantially identical to the embodiments described above and shown in FIG. 1, 2, or 5, and therefore a repeated description of these steps is omitted.

In comparison to the embodiment shown in FIG. 7, not film but rather plastic granulate 91 is unrolled from a magazine roller and fed via diverter rollers to the further heated rotating calender roller 14. The plastic granulate 91 is thereby fed on a bottom of the artificial turf 2. For this purpose, the plastic granulate 91, which is provided in a container, is evenly scattered on the bottom U of the artificial turf 2. The plastic granulate 91 can comprise any desired polymer compositions. In particular, the plastic granulate 71 can also include fibre scrap from old artificial turf, which improves the recyclability of the artificial turf to be produced.

The artificial turf 2 and the plastic granulate 91 are then guided between the surface of the further calender roller 14 and the contact rollers 15 and fused together, thereby forming the coated artificial turf 2''''. This is carried out substantially identical to the process described on the basis of FIG. 8 and is therefore not described in further detail below.

After the coated artificial turf 2'''' and the plastic granulate 91 are fused, the coated artificial turf 2'''' is fed away the further calender roller 14 and cooled. As shown in FIG. 9, the coated artificial turf 2'''' can be cooled by guiding the coated artificial turf 2'''' over a rotating cooling roller 17. The cooling roller 17 can either be passively cooling (e.g. room temperature or above) or actively cooling, wherein the actively cooled cooling roller 17 is cooled to a pre-determined temperature below room temperature via a cooling assembly (not shown).

The coated artificial turf 2'''' is subsequently fed away from the cooling roller 17 and further fed to a perforation roller 18. The perforation roller 18 comprises means for perforating the coated artificial turf 2'''', which is shown by jagged lines in FIG. 9. Through the perforation of the coated artificial turf 2'''', apertures are specifically introduced into the coated artificial turf 2'''', which impart a desired water permeability to the coated artificial turf 2'''' during use.

After cooling and perforation, the coated artificial turf is rolled up and magazined 2''''. The process of rolling up and magazining the coated artificial turf 2'''' on a magazine roller 19 is carried out substantially identically to the embodiment shown in FIG. 1, 2, or 5, for which reason a further description of these steps is again omitted.

In the following, the structure of the artificial turf 2, 2' according to an embodiment of the present invention will be described in further detail based on FIGS. 11 and 12. FIG. 11 shows a schematic sectioned side view of the artificial turf 2, 2' according to one embodiment of the present invention. The artificial turf 2, 2' according to the invention comprises a carrier material 21 and a plurality of fibres 22 tufted therein. The fibres 22 comprise two exposed ends 221 extending from a surface O of the carrier material 21, as well as a connected region 222 arranged in a loop-like manner at a bottom U of the carrier material 21. At this connected region 222, the fibres 22 are connected to the carrier material 21 via a melting connection, which is represented by a dark region in FIGS. 11 and 12. The carrier material 21 and the fibres 22 can be formed from substantially the same material, for example PE or PP. The selection of the same materials reduces the number of different materials used in the artificial turf 2, 2', which has a positive effect on recyclability and environmental friendliness. As shown in FIG. 11, the artificial turf 2, 2' can further comprise a film 23 arranged on the entire bottom U of the carrier material 21. The film 23 is connected to the bottom U of the carrier material 21 as well as to the connected regions 222 of the fibres 22. On the one hand, this strengthens the connection between the fibres 22 and the carrier material 21, which is often measured by pull-out strength in practice. On the other hand, this increases the stability of the entire artificial turf 2, 2'.

In the embodiment shown in FIG. 11, the film 23 is a single-layer film (also known as a monofilm). The film 23 is attached with the method according to the invention described above and can be formed from substantially the same material as the carrier material 21. The selection of the same materials for the carrier material 21 and the film 23 also reduces the number of different materials used in the artificial turf 2, 2', which likewise has a positive effect on recyclability and environmental friendliness. Moreover, the film 23 can be made of recycled material, such as artificial turf scrap from old artificial turf. This enables the implementation of a closed scrap loop and a reduction of $CO_2$ emissions of the produced artificial turf 2, 2'.

FIG. 12 shows a detailed view of a region A of FIG. 11 according to one embodiment of the present invention. In this embodiment, the film 23 is a multi-layered film (also known as a co-extrusion film). The film 23 comprises a first layer 231, a second layer 232, and a third layer 233. The first layer 231 is arranged at the bottom U of the carrier material 21. The second layer 232 is arranged on the first layer 231 and is enclosed or surrounded by the first layer 231 and the third layer 233, respectively. Such a three-layered film 23 can be produced, for example, via the co-extrusion process.

According to one embodiment of the present invention, the carrier material 21 and the third layer 233 are formed from substantially the same material, and the second layer 232 is formed from artificial turf scrap or from old artificial turf. The use of substantially the same material or type of material for the carrier material 21 and the first layer 231 and the third layer 233 increases the recyclability of the artificial turf 2', because, in this case, few or no other materials or types of material (e.g. latex, polyurethane, etc.) are contained in the artificial turf 2'. In order to still allow material that has been contaminated with, for example, sand, latex, polyurethane, or infill residues to be reused in the production of the artificial turf in the sense of a closed scrap loop, the second layer 232 of the film 23 can comprise such a material. This is particularly advantageous when recycled material from old artificial turf is to be reused but is contaminated with latex, for example. The soiled scrap material can thus be incorporated and stabilized between two substantially pure layers. Thus, for example, the blown film process does not result in an undesirable bursting of the hose bubble by dirt particles.

The first layer 231 shown in FIG. 12 can also be formed from a material having modified adhesion properties. Here, on the one hand, an adhesion agent can be added to the material of the first layer 231 described above, wherein the adhesion agent can comprise, for example, maleic anhydride (MAH). On the other hand, a material with molten glue-like properties can be used, for example ethylene-vinyl acetate (EVA). It is also conceivable that a material other than the one described above can be imparted with these bonding agents in order to achieve the desired modified adhesion properties. The use of such materials or additives for the material of the first layer 231 improves the adhesion between the carrier material 21 and the multi-layer film 23 and the stability of the artificial turf 2'.

Below, various strength and quality characteristics determined in various test methods are summarized in Table 1. Dimensional stability was measured according to ASTM standard. Tuft binding was measured according to ISO 4919/EN 15330-1. The slip lock was measured according to ISO 4919. Strength and elongation were measured according to ISO 13934-1/EN15330-1.

Various artificial turfs are listed in tabular form in Table 1. The artificial turfs have been categorized according to various types (A, B, C, and D). Artificial turfs not according to the invention have been marked with "Ref" and represent artificial turf of the respective type according to the prior art, with which the artificial turf according to the invention is being compared. The column "Fibre(s)" indicates what type and how many fibres were used in a tuft. The "Pole height" indicates how high the free ends of the fibres project from the carrier material. The stitch rate indicates the number of tufts, i.e., arrays of fibres having two free ends and one connected end, per 10 cm in a row direction. The distance between the adjacently arranged rows, i.e. the distance from one tuft row to an adjacent tuft row, is referred to as "Splitting" in a splitting direction. Typically, the splitting is indicated in inches. The column "Coating" indicates what type of coating or film is attached to the bottom of the carrier material.

The measurement results are given for the respective artificial turf on the right side of the table. The dimensional stability was measured after temperature simulation at 70° C. for 24 hours after 48 hours at room temperature and after 72 hours at room temperature. It indicates by what percentage two predetermined points on the artificial turf have shifted in a row direction (longitudinal) and in a direction orthogonal to the row direction (transverse) after the thermal treatment. In addition, the average of these two values (mean) is given in Table 1. "Tuft bond" is understood to mean the force required to pull a fibre bundle out of the artificial turf. "Slip-lock" is understood to mean the force required to pull a single fibre or free end out of the artificial turf. The slip-lock is only measured when mono-filaments are used, because, in the case of fibrillated ribbons, individual fibres cannot be removed from the artificial turf. "Rug strength" refers to the strength and elongation of the entire artificial turf.

As can be seen in Table 1, in the artificial turf of type A according to the invention as well as in the artificial turf of type B, very similarly high strength and quality characteristics are achievable as in the conventional artificial turf (A/Ref and B/Ref) without latex or polyurethane being processed. In some measurements, the strength and quality values of the artificial turf according to the invention even exceed those of the artificial turf of the prior art. The artificial turf according to the invention of types C and D also achieve common strength and quality characteristics. The artificial turf produced by the method according to the invention thus has high quality and high recyclability.

| Type/ Number | Fibre(s) | Pole height [mm] | Stitch rate | Splitting ["] | Coating | Dimensional stability [%] | | | | | | Tuft bond [N] midpoint | Slip lock [N] plain yarn midpoint | Rug strength (Grap Tear) midpoints | |
|---|---|---|---|---|---|---|---|---|---|---|---|---|---|---|---|
| | | | | | | 72 h/70° C. after 24 h | | | after 48 h | | | | | Strength [N/mm] | Elongation [%] |
| | | | | | | longitudinal | transverse | average | longitudinal | transverse | average | | | | |
| A/1 | 1 fibrillated ribbon | 55 | 14 | 3/4 (19.04 mm) | 150 µm blown film mono, 100% production scrap (PE-PA) | -0.4 | -0.1 | -0.2 | -0.4 | -0.1 | -0.2 | 44.9 | — | 25.0 | 0.10 |
| A/2 | 1 fibrillated ribbon | 55 | 14 | 3/4 | 150 µm blown film 3-layer, 100% virgin material | -0.4 | -0.1 | -0.2 | -0.4 | -0.1 | -0.2 | 45.2 | — | 25.2 | 0.10 |
| A/3 | 1 fibrillated ribbon | 55 | 14 | 3/4 | 180 µm blown film 3-layer MAH, 15% EOL. | -0.2 | -0.1 | -0.1 | -0.2 | -0.1 | -0.2 | 48.2 | — | 26.1 | 0.10 |
| A/Ref | 1 fibrillated ribbon | 55 | 14 | 3/4 | 85% PE-PA Polyurethane -> Reference Standard | -0.1 | -0.3 | -0.2 | -0.1 | -0.1 | -0.1 | 40.8 | — | 30.8 | 0.09 |
| B/1 | 1 fibrillated ribbon and 4x monofilament textured | 30 | 17 | 3/8 | 180 µm blown film 3-layer. 15% EOL. 85% PE-PA | -0.2 | -0.1 | -0.1 | -0.2 | 0.0 | -0.1 | 68.1 | 46.4 | 20.1 | 0.11 |
| B/2 | 1 fibrillated ribbon and 4x monofilament textured | 30 | 17 | 3/8 | 450 µm laminar film mono, 100% PE-PA | -0.2 | -0.1 | -0.1 | -0.3 | -0.1 | -0.2 | 70.3 | 47.1 | 25.8 | 0.12 |
| B/Ref | 1 fibrillated ribbon and 4x monofilament textured | 30 | 17 | 3/8 | latex -> reference standard | 0.0 | 0.0 | 0.0 | 0.0 | 0.0 | 0.0 | 79.9 | 43.7 | 28.6 | 0.10 |
| C/1 | 8x mono-filament | 40 | 15 | 3/8 | 550 µm laminar | -0.3 | -0.2 | -0.3 | -0.3 | -0.1 | -0.2 | 51.2 | 9.03 | 17.4 | 0.11 |

-continued

| Type/Number | Fibre(s) | Pole height [mm] | Stitch rate | Splitting ['] | Coating | Dimensional stability [%] 72 h/70° C. after 24 h longitudinal | transverse | average | after 48 h longitudinal | transverse | average | Tuft bond [N] midpoint | Slip lock [N] plain yarn midpoint | Rug strength (Grap Tear) midpoints Strength [N/mm] | Elongation [%] |
|---|---|---|---|---|---|---|---|---|---|---|---|---|---|---|---|
| | plain yar and Bx mono-filament textured | | | (9.52 mm) | film mono 30% EOL, 70% PE-PA | | | | | | | | | | |
| C/2 | 8x mono-filament plain yarn and 8x mono-filament textured | 40 | 15 | 3/8 | 180 µm blown film 3-layer EVA, 15% EOL, 85% PE-PA | -0.2 | -0.1 | -0.2 | -0.2 | -0.1 | -0.2 | 49.4 | 8.92 | 15.8 | 0.10 |
| D/1 | 1 fibrillated ribbon | 18 | 22 | 3/16 (4.76 mm) | 650 µm laminar film 3-layer MAH. 50% EOL, 50% PE-PA | -0.3 | -0.2 | -0.3 | -0.4 | -0.2 | -0.3 | 30.7 | — | 16.6 | 0.10 |
| D/2 | 1 fibrillated ribbon | 16 | 22 | 3/16 | 700 µm laminar film mono. 50% EOL. 50% PE-PA | -0.3 | 0.2 | -0.1 | -0.4 | 0.2 | -0.1 | 30.1 | — | 17.5 | 0.12 |

Above, the case has been considered in which the carrier material, the fibres, and the film are each made of plastics. In the sense of the invention, the carrier material, the fibres, and the film can also be made from different materials (e.g. organic materials) than those mentioned herein.

In the sense of the invention, the term "artificial turf" also includes any other laminar apparatuses or products comprising one or more fibrous protruding elements and manufactured according to the present invention.

Further advantageous configurations and variations arise for the person skilled in the art from the embodiment examples described herein and are understood by him or her as belonging to the invention.

The invention claimed is:

1. A method for producing an artificial turf, comprising the following steps:
  providing a carrier material having a top and a bottom;
  providing a plurality of fibres, wherein each fibre comprises:
    two ends extending from the top of the carrier material; and
    a connected region arranged in a loop-like manner at the bottom of the carrier material;
  providing a plastic granulate;
  feeding the carrier material with the fibres to a heated rotating calender roller;
  guiding the carrier material with the fibres and the plastic granulate over at least one sub-region of the surface of the heated rotating calender roller, wherein the connected regions of the fibres and the bottom of the carrier material face the heated rotating calender roller, wherein at least one rotating pressure roller is spaced apart by a calender gap and is arranged substantially axis-parallel to the heated rotating calender roller, and wherein the pressure roller presses the carrier material with the fibres and the plastic granulate against the heated rotating calender roller with a predetermined pressing force;
  during the guiding of the carrier material with the fibres over the at least one sub-region of the surface of the heated rotating calender roller:

transferring heat from the heated rotating calender roller to the carrier material with the fibres and the plastic granulate, and
    fusing the connected regions of the fibres with the bottom of the carrier material and the plastic granulate to the artificial turf; and
  removing and cooling the artificial turf.

2. The method for producing the artificial turf according to claim 1, further comprising:
  providing the plastic granulate;
  wherein, after the step of removing and cooling the artificial turf, the plastic granulate is fed between a bottom of the artificial turf and a further heated rotating calender roller,
  transferring heat from the further heated rotating calender roller to the bottom of the artificial turf and the plastic granulate;
  fusing the bottom of the artificial turf with the plastic granulate to form a coated artificial turf; and
  removing and cooling the coated artificial turf.

3. The method for producing the artificial turf according to claim 1, wherein the carrier material and the plastic granulate is formed from substantially the same type of material.

4. The method for producing the artificial turf according to claim 1, wherein the carrier material and the fibres are formed from substantially the same type of material.

5. The method for producing the artificial turf according to claim 1, wherein the carrier material comprises recycled and recyclable material, the fibres comprise recycled and recyclable material, or both the carrier material and the fibres comprise recycled and recyclable material.

6. The method for producing the artificial turf according to claim 1, wherein the plastic granulate comprises recycled and recyclable material.

7. The method for producing the artificial turf according to claim 1, further comprising:
  thermally treating the artificial turf by means of steam or hot air;
  perforating the artificial turf; or
  performing both the thermally treating and the perforating the artificial turf.

* * * * *